Dec. 5, 1967  G. A. ZIPPEL  3,356,433
FILING CABINET

Filed April 25, 1966  8 Sheets-Sheet 1

INVENTOR.
GEORG A. ZIPPEL
BY
ATTORNEYS

Dec. 5, 1967  G. A. ZIPPEL  3,356,433
FILING CABINET
Filed April 25, 1966  8 Sheets-Sheet 2
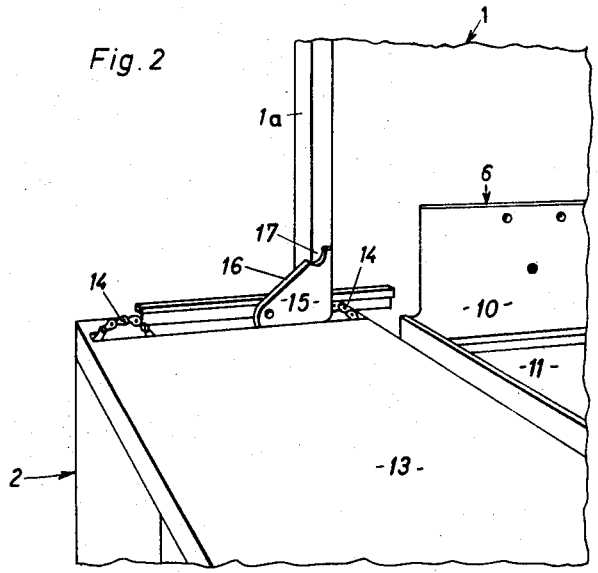
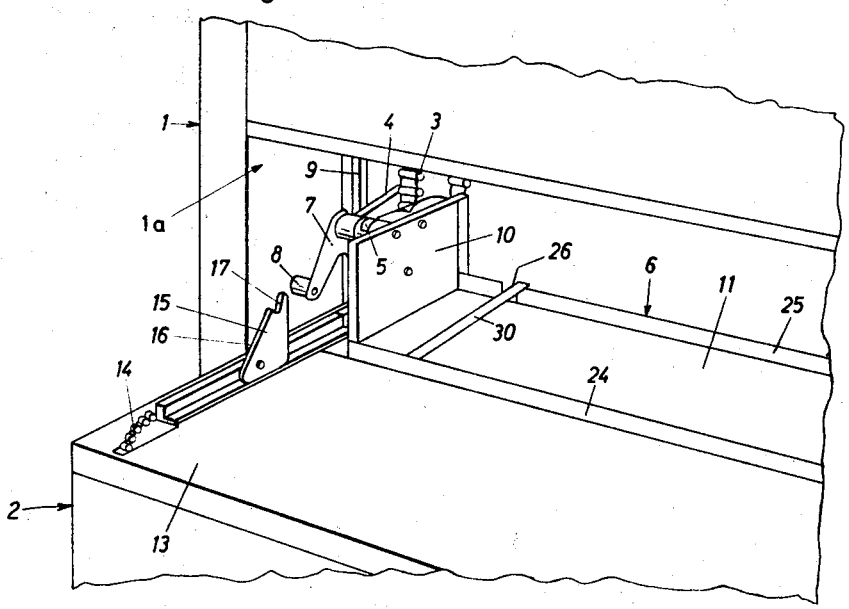
INVENTOR.
GEORG A. ZIPPEL
BY
ATTORNEYS

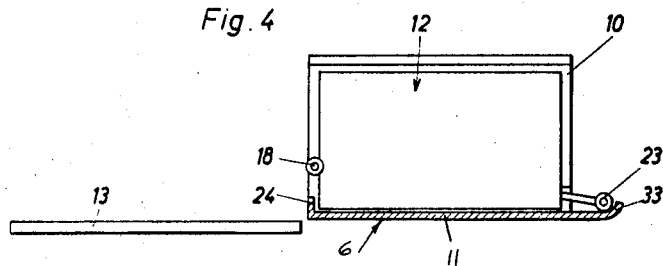
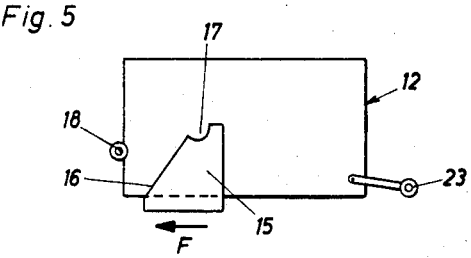
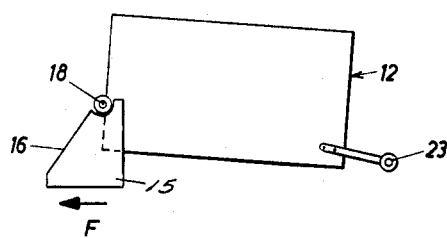

Dec. 5, 1967 G. A. ZIPPEL 3,356,433
FILING CABINET
Filed April 25, 1966 8 Sheets-Sheet 4

INVENTOR.
GEORG A. ZIPPEL
BY
ATTORNEYS

Dec. 5, 1967  G. A. ZIPPEL  3,356,433
FILING CABINET

Filed April 25, 1966  8 Sheets-Sheet 5

INVENTOR.
GEORG A. ZIPPEL
BY
ATTORNEYS

Dec. 5, 1967  G. A. ZIPPEL  3,356,433
FILING CABINET

Filed April 25, 1966  8 Sheets-Sheet 6

INVENTOR.
GEORG A. ZIPPEL
BY
ATTORNEYS

Dec. 5, 1967  G. A. ZIPPEL  3,356,433
FILING CABINET

Filed April 25, 1966  8 Sheets-Sheet 8

INVENTOR.
GEORG A. ZIPPEL
BY
*Wackham, Blanchard & Flynn*
ATTORNEYS

United States Patent Office 3,356,433
Patented Dec. 5, 1967

3,356,433
FILING CABINET
Georg Alfred Zippel, 31 Muhlweg, 8503 Altdorf,
near Nurnberg, Germany
Filed Apr. 25, 1966, Ser. No. 545,061
Claims priority, application Germany, Apr. 23, 1965,
Z 11,496, Z 11,498
24 Claims. (Cl. 312—223)

ABSTRACT OF THE DISCLOSURE

A filing cabinet comprising a plurality of carriers having trays thereon, each of said carriers being suspended by carrier arms from an endless flexible drive member. A work counter having conveying means mounted therein is provided in front of the cabinet adjacent an access opening therein. Stoppage of the carrier means adjacent the access opening permits the conveying means to be actuated for automatically engaging one of the trays whereby same is horizontally removed from the carrier member and is positioned adjacent the upper surface of the work counter. Safety switches positioned adjacent the access opening automatically shut off the endless drive mechanism if one of the trays improperly extends outwardly from the carrier member.

---

Figure 1:
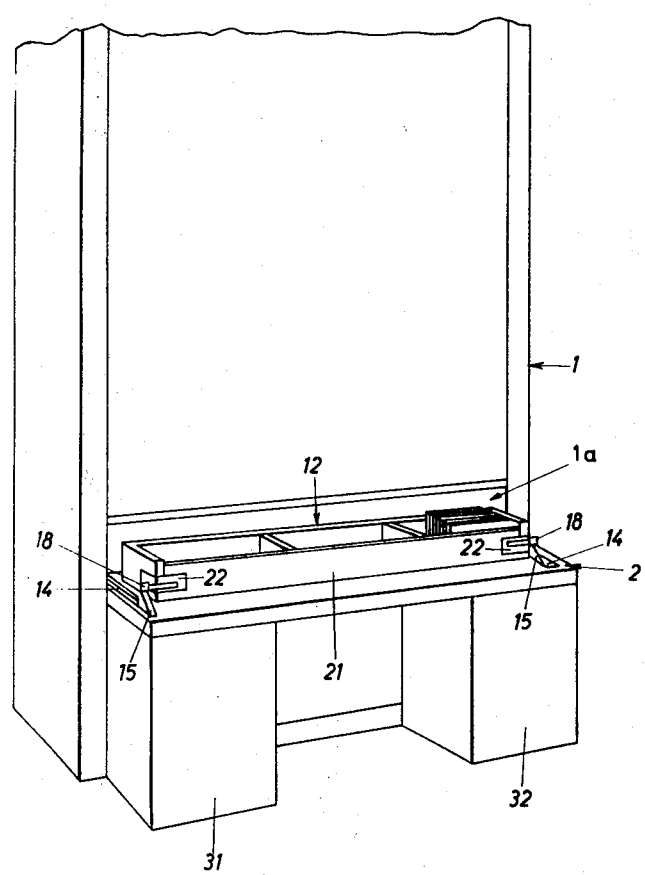

The present invention relates to a filing cabinet, suitable for housing index cards, comprising carriers suspended by carrier arms for rotation upon carrier means in the form of endless chains, belts, or the like, the carriers being prevented from oscillating, but being accelerated at the turning points of the carrier means and there being provided also a work bench located at the front of the filing cabinet.

In order to increase the capacity of known filing cabinets, the space between the carriers is made very small. This creates the difficulty that the carrier which has arrived in the vicinity of the working area is not accessible from above. In one known filing cabinet of this type this difficulty is overcome by guiding the leading chain-tracks from above, arranging them to slant forward and up to the working area, so that in the vicinity of the working area a stepping of the carriers is attained. Although the particular carrier lying in the vicinity of the working area is thus easily accessible, the danger arises that the operator, who is occupied with the filing cards in this carrier, might be injured if the carriers inadvertently set the drive in motion by being repeatedly pushed together or by their movement relative to the surface of the work bench.

It is in fact known, in an endless drive file installed in a cabinet, to fit a yieldably mounted switch frame which extends over the plane of the working area along the edges an access opening and lies within reach of the carriers in the vicinity of the working area. The switch frame interrupts the energy supply to the endless drive as soon as it is pressed up or down by named contact or by a box of cards pulled from a carrier into the working area. However, this known switch frame hinders work on the filing cabinet and does not guarantee that the danger of injury to the operator is completely eliminated, since boxes of cards placed on the carriers must be lifted up over the switch frame onto the working area.

The invention solves the problem of developing a filing cabinet having simple and space-saving means such that not only is the carrier in the working area more easily accessible, but in addition the danger of injury to the operator is certainly and completely eliminated.

The problem is solved by virtue of the fact that each carrier is in the form of a shelf having side walls and an approximately horizontal floor adapted to receive a tray which is adapted to receive filing media such as index cards, which tray can be automatically brought from the floor to the work bench, whilst conveying-means comprising lugs laterally enclosing the tray are provided at each side of the working area.

In this way it is ensured that the desired tray is freely accessible from above in the working area and can be operated from a seated position, since the space beneath the working area may be used as leg room for the operator. The latter is also not compelled to make hand movements in the area between the carriers, so that he is not himself in any danger of being injured if the endless drive is unintentionally set in motion.

Another considerable difficulty arises, when transporting the tray from the carrier to the working area, owing to the fact that very often there are considerable differences in level between the shelf and the working area. This in turn is due to the fact, as a result of the great revolving weight, the filing cabinet cannot be accurately stopped at a predetermined position.

This difficulty is overcome in accordance with the invention in that the tray carries at each end, near its front, a pin co-operating with a lug formed as a ramp extending upwards from the working area, which ramp opens at its upper end into a bearing notch for the pin.

In this way there is attained the advantage that the tray is first lifted at the front and then conveyed to the working area, so that differences in level between the tray and the working area are immaterial.

In order that the tray may be easily movable, it may be provided with rollers on its underside, in the vicinity of its rear edge.

Since the shelves are accelerated at the turning points of the carrier system, it is preferable that the support surface of each shelf is provided on its longitudinal edges with flanges to hold the tray positioned thereon. The rear flange is keyed in the vicinity of the rollers and each key is in the form of a length of rail jutting out rearwardly from the support surface, whilst each roller is arranged so as to overlap the outline of the tray towards the rear. Thus each tray stands securely on its shelf but can, nevertheless, be pulled a long way forwards.

In order to achieve a conveying means which is space-saving and does not hinder the revolving of the filing cabinet, the conveying means can be in the form of reversible chain-drives with one lug on each, the distance between the lugs being greater than the length of the tray, but less than the distance between the chain drives.

Each tray can be brought even further forward if a rail protruding over the breadth of the tray is arranged on each side wall of a shelf with one roller protruding laterally over the outline of the tray.

In order to secure the tray in the shelf, each rail can open at the rear end into a support bearing for the roller arranged beneath the level of the rail; in this way the tray is also supported when pushed in on the floor of the shelf.

In some cases it is preferred to arrange the pins or rollers laterally on each tray in the vicinity of the front wall, the pins or rollers, when the tray is pushed in, being supported on the rail co-operating therewith. Then the floor of the shelf can be omitted. Moreover there is then no need for a bench in the working area for supporting the tray which has been pulled forward.

A particularly space-saving conveying-means can consist of a rack slidable in horizontal guides, and in which engage two pinions, driven in the same angular sense by a gear wheel arranged between them. The racks can be very short because the pinions engage with the rack one after the other. Thus the racks do not jut out over the guides, even when the tray has been pulled right to the front.

In a preferred embodiment, the filing cabinet is provided with an access opening, in front of which is a work bench. The filing cabinet has an aesthetically pleasing and modern appearance and the filing mechanism is fully protected against dust or damage.

In this connection it is useful if the access opening has fixed near its edges a vertically yieldable switch frame arranged on the cabinet, with an upper and a lower horizontal switch strip for stopping the carrier drive. The lower switch strip is designed as a loosely rotatable roller, which overtops both the upper surface of the working area and the leading edge of the particular shelf standing in the working position at the access opening when the filing cabinet mechanism is stationary. Such a switch frame prevents the carrier-drive from being set in motion if one of the trays protrudes into or is moved through the access opening. Thus on the one hand damage to the filing cabinet is prevented and, on the other hand, injury to the operator, in the case the latter for any reason reaches through the access opening when the shelves are revolving, and is caught by the mechanism. The switch frame, which is guidably arranged on the cabinet, immediately interrupts the supply of energy to the carrier drive as soon as the switch frame is displaced either up or down by any force acting thereon. In this way danger of injury to the operator is completely eliminated even when, instead of a tray, filing boxes or other containers have to be placed on one or several of the shelves.

Figure 7:
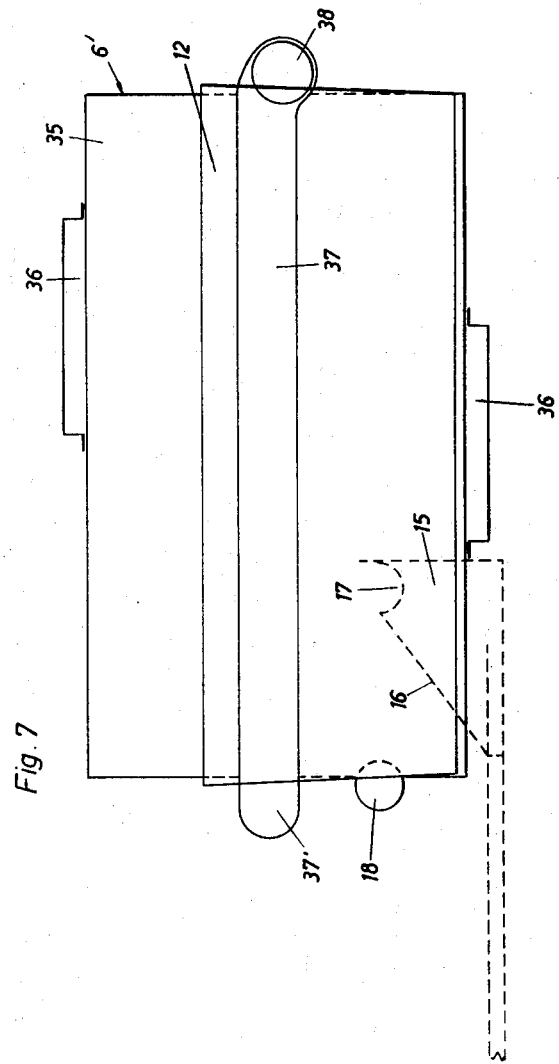
Figure 8:
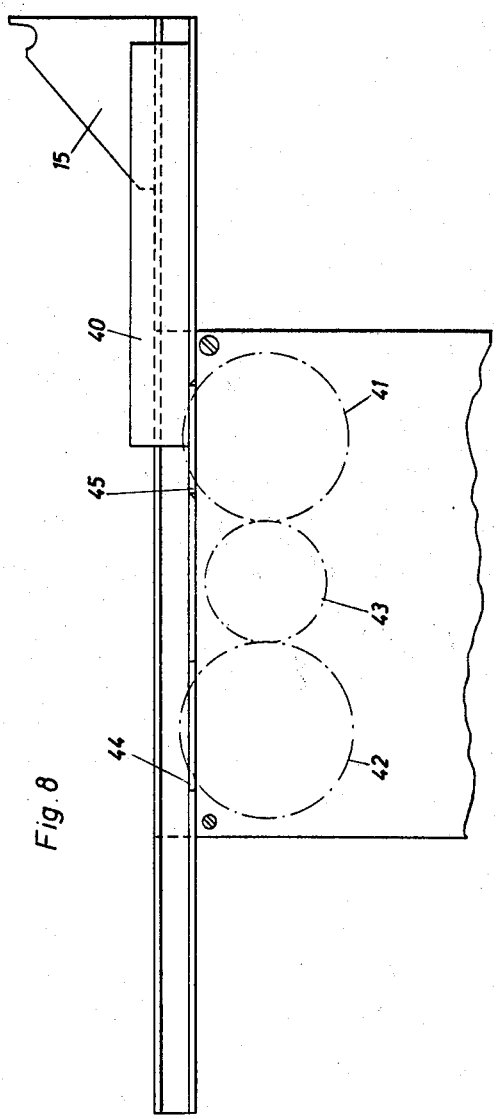
Figure 9:
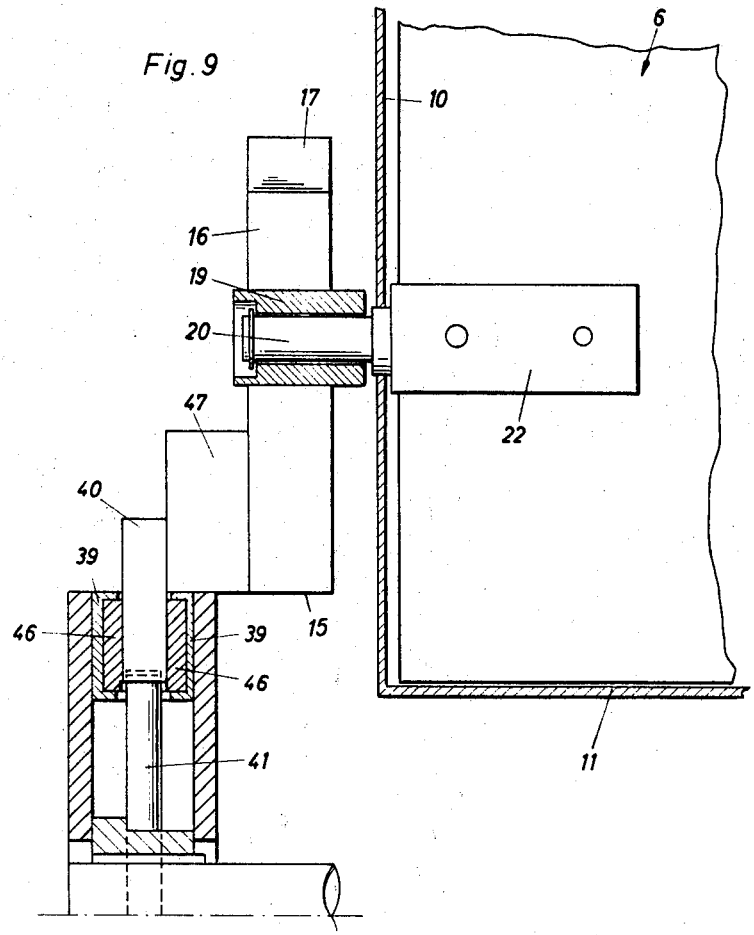
Figure 10:
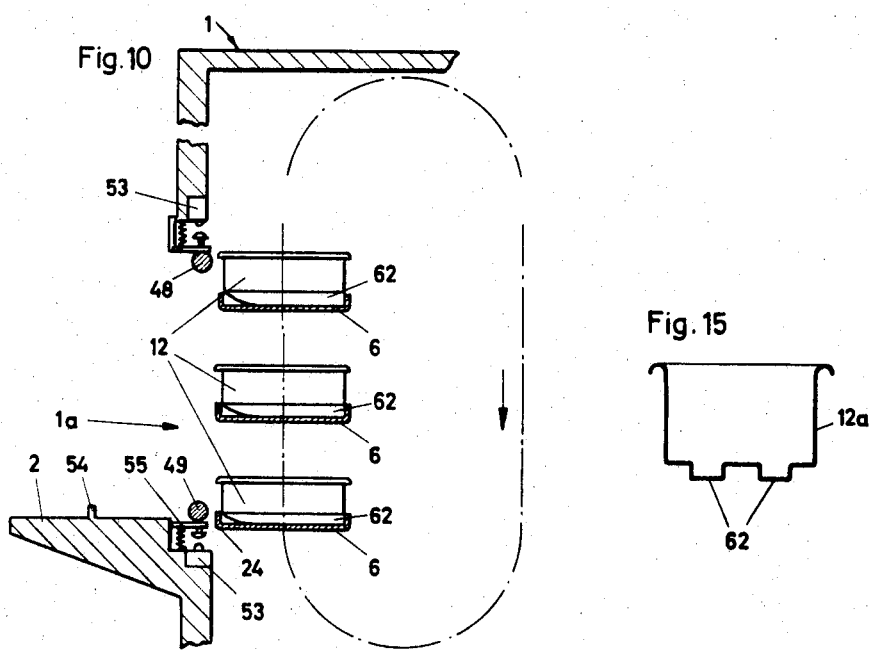
Figure 11:
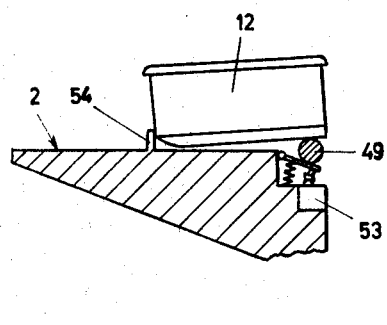
Figure 12:
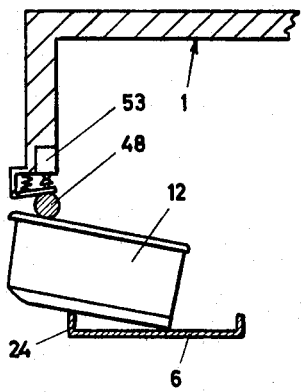
Figure 13:
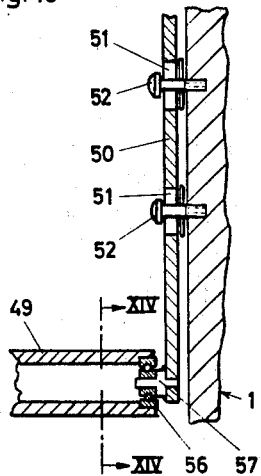
Figure 14:
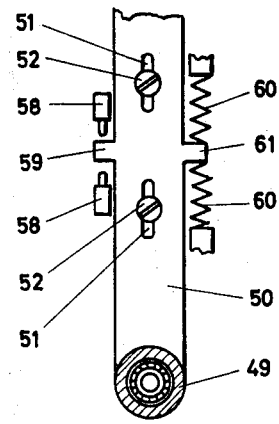

Preferred forms of the invention will now be described with reference to the accompanying drawing in which:

FIGURE 1 is a perspective front view of a filing cabinet with a tray lying in the working area, FIGURE 2 is a similar view of the working area with a lateral conveying arrangement, FIGURE 3 shows a shelf in perspective, FIGURE 4 a side elevation of a shelf with a tray placed thereon, FIGURE 5 is a schematic side view of a tray in a resting position, FIGURE 6 is a schematic view of the same tray after it has travelled on to a lug, FIGURE 7 a side elevation of another embodiment of a tray lying on a shelf, FIGURE 8 is a side view of the lateral conveying arrangement shown in FIGURE 7, FIGURE 9 is a cross section through the conveying arrangement, FIGURE 10 is a section through the working area of the filing cabinet, the access opening of which is equipped with a switch frame for stopping the carrier drive, FIGURE 11 is a section, on a larger scale, through the working area of FIGURE 10 in the vicinity of the lower switch strip of the switch frame, FIGURE 12 is a section through the working area in accordance with FIGURE 10 in the vicinity of the upper switch strip of the switch frame, FIGURE 13 is a part section through another embodiment of a switch frame, FIGURE 14 is a section on the line XIV—XIV of FIGURE 13, and FIGURE 15 is a cross section through a tray manufactured from plastics material.

As may be seen from FIGURES 1, 2 and 3, the filing cabinet indicated generally at 1 is formed with an access opening 1a, in front of which is a work bench 2.

In the cabinet there are arranged, at opposite ends, carrier means in the form of endless carrier-chains 3 (FIGURE 3) carrying arms 4, fixed thereon by bolts 5, on which in turn are rotatably mounted carriers in the form of shelves indicated generally at 6. The shelves are disposed one above the other and rotate in endless fashion when the chains are set in motion. The shelves 6 are suspended so as to be prevented from oscillating at least when in the vicinity of the working area. As shown in FIGURE 3 the means for preventing oscillation consist of an angle-arm 7 which is fixed on the bearing bolt 5 of the shelf 6 and which carries rollers 8 at both of its ends. The roller 8 which is not visible in FIGURE 3 protrudes into and moves in a slide-path 9 and in this manner prevents the shelf 6 from changing its suspension-position relative to the working area. The roller 8 which is visible in FIGURE 3 co-operates at the turning points of the endless carrier-chains, in the manner already indicated, with a second slide-path (not shown).

Each shelf 6 has side walls 10 and an approximately horizontally extending floor 11 to carry a tray 12 (FIGURE 4) freely standing on the shelf. The tray 12 is preferably adapted to receive index cards or similar filing media.

Each of the trays 12, once it has arrived in the working area, is automatically brought from the floor 11 onto the bench surface 13 of the working area, with the aid of conveying means located at each side of the work bench 2.

In the example according to FIGURES 1 to 3 each of these conveying means consists of an endless belt or a chain 14 which is partly let into the work bench 13 so that only the upper track of the chain 14 runs over the bench. To the upper track (or to a chain-link thereof) is connected a lug 15 formed with a ramp 16 extending upwardly from the bench, the ramp having at its upper end a bearing notch 17 for a pin 18, there being such pins laterally arranged on each tray 12 so that they overlap its side walls. As may be seen from FIGURE 9, each of these pins may consist of a roller 19, for example of plastics material, which is rotatably mounted on a trunnion 20. It may be seen from FIGURES 5 and 9 that the bearing pins 18 (or the rollers 19) are arranged on the front side 21 of the tray 12, in the lower part thereof, with the aid of mountings 22.

Each tray 12 is provided on its under side, in the vicinity of its rear edge, with at least two widely spaced rollers 23. The support floor 11 of each shelf 6 is formed at its front longitudinal edge with a flange 24, and on its rear longitudinal edge with a flange 25, the arrangement being such that the rear flange 25 is keyed in the vicinity of the rollers 23, each key 26 (FIGURE 3) being in the form of a piece of rail jutting out towards the rear over the support surface 11. Thus the advantage is attained that the tray 12 can be pushed well to the front of the bench surface 13 without the rollers 23 slipping off the floor 11 of the shelf 6. The front flange 24 serves to secure the tray 12 lying on the floor 11, and prevents the tray 12 from slipping even while the shelf is revolving.

The laterally arranged conveyor-chain drives 14 are preferably connected by a shaft so that they revolve synchronously. For example, they may be driven through this shaft by a reversible electric motor. As may be seen from FIGURE 9 for example, the distance between the lugs 15 is greater than the length of the shelf 6, but less than the distance between the two conveyors 14, laterally of the work bench.

The filing cabinet is operated as follows:

Individual shelves 6 are provided with corresponding numbers or characteristics, which are also shown on an electrical control arrangement, e.g. in the form of a known pressure-key control. If, with the aid of this pressure-key control, a particular shelf is required on the working surface 13, then a drive motor sets the carrier chain drives 3 in motion until the desired shelf 6 has arrived at the level of the work bench 2.

The drive motor is then stopped, in known manner, for example with the aid of micro-switches, and with it the carrier-chains 3. At the same time an electric motor for driving the conveyor-chains 14 on the work bench 13 is energised, so that the lugs 15 are conducted from their rear end-position forwardly through the access opening 1a and out of the cabinet 1. In FIGURE 5 a lug 15 is shown in its rear end position. As soon as the conveyor-chains 14 have been set in motion, the lug 15 slides in the direction of the arrow F (FIGURE 5) whilst it is supported on the surface of the work bench. After a short time the ramp 16 strikes against the roller or the pin 18 mounted on the tray 12. The tray cannot at first take part in the movement of the lug 15, because it is prevented from so doing by the front flange 24 of the floor 11. Consequently the pins or the rollers 18 slide upwardly on the ramp 16 until they slip into the notches 17 on the lugs 15 (FIGURE 6). In this way the front of the tray 12 is lifted to such an extent that its lower front edge clears the front flange 24 of the floor 11. The tray 12 can thereafter participate in the movement of the lugs 15 in the direction of arrow F; the tray is drawn forward by the lugs onto the work bench surface 13, the rollers 23 rolling on rails 30 or corresponding reinforcement ribs of the floor 11, until they arrive at the flange 24. At this moment the drive motor for the conveyor-chains 14 is stopped and the required tray stands in the working area immediately in front of the operator.

It should be emphasised that in FIGURE 6 the lifting of the tray is illustrated on a greatly exaggerated scale for the purposes of clarity. In practice the height of the flange 24 and the height of lift of the tray 12, need be quite small so that the tray is moved into a position which slopes by an immaterial amount. The operator can reach the whole length of the tray without difficulty because, on the one hand, it is fully and freely accessible from above and, on the other hand, there is free space beneath the bench surface 13 in the centre of the cabinet 1 for the legs of a seated operator. Casings 31 and 32 are provided on both sides of the work bench 13 merely in order to cover the lateral carrier and conveying mechanisms.

The work bench 13 may be provided with a casing projecting upwards and which is sufficiently high that it may be closed off by connection with the upper side of the tray 12 and joins the latter from the front and from the side as tightly as possible with its sides.

When the tray 12 is no longer needed, the lateral conveying means 14 are moved (by the setting into reverse motion of the appropriate drive motor) away from the working area on to the appropriate shelf 6. The rollers 23 then strike against stops 33 which can be formed by the upwardly curved key 26. In this position the tray can no longer participate in the movement of the lugs 15; the pins or rollers 18 slide down out of the bearing notches 17 via the ramps 16 until the tray 12 once more rests on the floor 11 of the shelf 6; the lugs 15 return to their initial position (FIGURE 5); the drive motor for the lateral conveying means 14 is then stopped once again, for example by micro-switches, and another tray can be brought to the working area.

In FIGURE 7 another form of shelf is schematically illustrated. Here each shelf 6' has sidewalls 35, and these connect profiles 36. The lower profile may serve as a support for the tray 12. So that the tray 12 can be drawn forward as far as possible, one slide path 37 is fixed to the side wall 35, in which are arranged slide-path rollers 38, guided in the vicinity of the rear edge of the tray 12. In order to relieve the slide-path 37 and the rollers 38 from strain, the rear end of the slide-path 37 can be directed slightly downwards, so that the tray 12 lies with its floor on the profile 36 when it has reached its end position on the shelf 6'.

The functioning of this filing cabinet is similar to that of the one previously described. The pins or rollers 18 run up the ramps 16 when the lugs 15 are displaced, and slip into the bearing notches 17. The tray 12 is thus lifted off the lower profile strip 36, the rollers 38 meanwhile sliding forwardly on the slide-paths 37 until they are restrained from further movement by the forward end 37'. When the drive motor for the lateral conveying means in the work-bench is switched off, the tray 12 has reached its end-position on the work bench 13.

Rollers similar to those shown at 38 may be mounted in the vicinity of the front wall of the tray 12, which rollers, when the tray 12 is pushed in, are supported on the slide-paths 37. For this purpose each slide-path 37 should be open at its front. In such a design the tray 12 is not supported on a support surface or a profile 36; the support surface is replaced by the slide paths 37.

In FIGURES 8 and 9 alternative conveying means are illustrated, which are laterally arranged in the work bench. In this embodiment each conveyor consists of a rack 40 displaceably mounted in horizontal guides 39. Two pinions 41 and 42 engage the rack 40 periodically one after the other, the toothed wheels being driven in the same sense by a gear wheel 43 arranged between them (FIGURE 8). The lug 15 is as before rigidly connected with the rack 40.

This embodiment has the advantage of affording a particularly efficient and simple mounting for the lug, without the various parts of the conveying-means projecting too far forward from the work bench. This is because a very short rack may be used, since the latter is driven at the beginning of the displacing movement by the rear pinion 41, and in the second half of the displacing movement by the front pinion 42. On pushing the racks back, engagement is effected in the reverse sequence.

Each guide 39 can be in the form of a single profile of C-shaped cross-section, corresponding apertures 44 and 45 being provided in the vicinity of the pinions 41 and 42. Coverings 46 (FIGURE 9) in the form of plastic plates, can be provided between the flanges of the guide 39, so that a particularly easy-moving but nevertheless accurate guiding of the rack is achieved. As may be seen from FIGURE 9, none of the racks is burdened with the weight of the shelf 6; instead a carrier-block 47 is arranged between the lug 15 and the rack 40, which carrier-block 47 slides on the guide 39 or the bench surface 13. This carrier-block 47 may also be made of synthetic plastics material.

The gear wheels 43 can be connected to each other by a shaft, so that the two conveyors run synchronously. As shown in FIGURE 10, there is provided, along the edges of the access opening 1a, a vertically yieldable switch frame mounted on the cabinet 1, consisting of an upper horizontal switch strip 48 and a lower horizontal switch strip 49 for stopping the carrier drive. At least the lower switch strip 49 is in the form of a loosely rotating roller, mounted on ball-bearings carried by vertical strips 50 (not illustrated in FIGURE 10: see FIGURES 13 and 14), which vertical strips form the side walls of the switch frame.

As may be seen from FIGURES 13 and 14, longitudinally extending slots 51, running in a vertical direction, are provided in the vertical strips 50, through which slots protrude guide-bolts 52 fixed to the cabinet 1. On displacing the switch frame up or down at least one switch 53 is actuated. In this way the drive of the revolving shelves 6 may be maintained or switched off. The work bench 2 preferably has a stop-strip 54 running parallel to the lower roller 49, the distance of which stop-strip 54 from the roller is less than the breadth of one tray 12. As a result, each tray 12 can be drawn out of the filing cabinet, only until it rests with its rear end on the lower roller 49. In this way the drive for the filing cabinet is switched off, whilst the switches 53, in known manner, are connected into the circuit of the drive for the shelves 6. Switch-feelers 55 of the switches 53 bear resiliently on the roller 49 and on the upper switch strip 48, which is for example similarly designed in the form of a roller or a rod.

The lower roller 49 lies above the upper surface of the work bench 2 and above the flange 24 of that shelf which lies, when the cabinet mechanism is stationary, at the access opening 1a. When a tray is pulled out, it rolls forward on the roller 49 and presses it downwards. When the front edge of the tray 12 strikes against the flange 24, the rear end of the tray 12 still rests on the roller 49 so that the drive for the filing cabinet remains switched off (see FIGURE 11).

The mode of operation of the upper roller 48 can be appreciated from FIGURE 12. When a tray 12 lies in the access opening 1a the drive for the filing cabinet is switched on nevertheless and the part of the tray 12 which projects to the front comes, during its upward movement, into contact with the lower side of the upper roller 48, and presses the latter upwards. Thus the upper switch 53 is actuated and the drive stopped before any damage can occur.

In FIGURES 13 and 14 is illustrated another embodiment of the switch frame together with ball-bearings for the rollers 48 and 49. These latter are each in the form of a tube, into both ends of which is pushed a ball bearing 56. Each ball bearing 56 is pushed onto a short axis-piece 57 which is fixed on the lower end of the vertical strip 50, for example screwed or welded thereon. In this embodiment of the switch frame there are provided switches 58 which can be actuated by an extension 59 rigidly connected with the strip 50. By means of pressure sprnigs 60 (fixed to the cabinet 1) which act on an extension 61 of the vertical strip 50, each of the pressure springs is retained in a neutral position as long as neither the lower nor the upper rollers are placed under strain. Instead of the two switches 58, a switch with a centre cut-out position may be used.

Referring to FIGURE 15, the trays 12 can be manufactured from plastic and/or may be equipped with slide pads 62. FIGURE 15 is a cross section through such a tray 12a, the upper edges of which can be curved outwardly in order to stiffen the walls.

It must be emphasised that the described and illustrated embodiments can be varied in many ways. Thus for example it is possible to form the shelves without floors 11 or pronounced side walls 10.

Furthermore the shelves can be prevented from oscillating in the vicinity of the work bench by other known means. For example this may be effected with the aid of vertical rails arranged to co-operate with vertical surfaces of the shelves.

The rollers 48, 49 can be mounted in the cabinet independently of each other so as to yield resiliently, in which case the vertical strips 50 can be omitted.

Finally it is to be emphasised that the described arrangements are suitable not only for keeping index cards or similar filing media, but also for example for sorting any kind of small parts which may be needed in mass production, or for mounting objects intended for sale, as for example shoes or the like.

The embodiments of the invention in which an exclusive property or privilege is claimed are defined as follows:

1. A filing apparatus, particularly usable with index cards, said apparatus comprising:
   a cabinet;
   a work counter having a work surface thereon positioned adjacent said cabinet;
   a plurality of trays with each of said trays having abutment means thereon;
   a plurality of carrier means for supporting said trays, each of said carrier means having a substantially horizontal shelf portion adapted to support thereon one of said trays;
   first elevating drive means connected to said carrier means for moving said trays relative to said cabinet, said first drive means comprising a rotatable conveying device including an endless flexible drive member and means rotatably supporting each of said carrier means on said endless drive member;
   means for stopping said first drive means whereby one of said trays is in an access position substantially adjacent the work surface on said work counter; and
   second drive means operable when said first drive means is stopped for automatically moving said one tray in said access position from said shelf and positioning same substantially above said working surface, said second drive means including movable lug means adapted to engage the abutment means of said one tray for moving same in a substantially horizontal direction.

2. An apparatus according to claim 1, wherein said conveying means includes a pair of drive wheels with said endless drive member being in driving engagement therewith, and motor means drivingly interconnected with one of said drive wheels for driving same, each of said carrier means being independently rotatably suspended from said endless drive member and being movable in a circular manner as the motor means drives the endless drive member through one complete revolution.

3. An apparatus according to claim 2, wherein guide means are interconnected to said carrier means for maintaining said shelf portion in a substantially horizontal plane.

4. An apparatus according to claim 1, wherein said second drive means includes means for vertically lifting the front edge of the tray away from the horizontal shelf portion as said tray is horizontally moved into a position adjacent said work surface.

5. An apparatus according to claim 1, wherein said lug means includes a pair of laterally spaced lugs positioned substantially adjacent opposite ends of said one tray when in the access position.

6. An apparatus according to claim 5, wherein each tray is provided with a laterally extending pin adjacent each end wall thereof, each lug being formed with an inclined ramp thereon and a notch adjacent the upper end of said ramp, relative linear movement between said lugs and said tray causing the pins to ride up the ramp so as to vertically lift the front edge of the tray with said pins becoming positioned within said notches so as to prevent further relative movement between the lugs and the tray.

7. An apparatus according to claim 6, wherein each tray is provided with rollers on the underside thereof adjacent the rear bottom edge.

8. An apparatus according to claim 6, wherein the horizontal shelf portion of the carrier means is provided with flanges at the front and rear edges thereof for retaining the tray thereon.

9. An apparatus according to claim 6, wherein the second drive means comprises conveying means including a pair of endless drive members with each of said drive members being interconnected to one of said lugs, the lateral distance between said lugs being greater than the length of a tray adaped to be positioned therebetween.

10. An apparatus according to claim 1, wherein each carrier means has a pair of wall members fixedly connected to opposite ends of the horizontal shelf portion, each of said wall members having a guide means thereon, and roller means mounted on said tray adapted to rollingly engage said guide means for guiding the tray for relative movement with respect to said carrier means.

11. An apparatus according to claim 10, wherein said guide means comprises a rail having a substantially horizontal portion and a downwardly directed end portion at the rear thereof, and wherein said roller means are mounted on the tray adjacent the rear edge thereof, relative movement between said carrier means and said tray causing the roller means to initially engage the end portion and vertically lift a portion of the tray from said shelf portion.

12. An apparatus according to claim 1, wherein said second drive means includes a gear rack slideably mounted on the work counter for movement in a substantially horizontal direction, and gear means drivingly engageable with said gear rack for linearly reciprocating same, said lug means being fixedly interconnected with said rack.

13. An apparatus according to claim 5, wherein said second drive means includes a pair of gear racks slideably mounted on opposite ends of said work counter for parallel movement in substantially horizontal directions, one of said lugs being interconnected to each of said racks, and gear means drivingly engaging said racks for linearly reciprocating same, said gear means including a first pair of drive gears each of which is adapted to mesh with one of said rack members, and an intermediate gear in meshing engagement with both of said drive gears, said one rack being initially in meshing engagement with only one of said drive gears whereby said gear rack is caused to move into meshing engagement with the other said drive gear, continual linear movement of the rack causing it to move out of meshing engagement with said one drive gear.

14. An apparatus according to claim 13, wherein said work counter is provided with guide means thereon for slideably guiding the linear movement of said gear racks, said guide means having a substantially horizontal slide surface thereon adapted to slidingly support a tray thereon.

15. An apparatus according to claim 1, wherein said cabinet is provided with an access opening therein adjacent the work counter through which the trays may be moved from the apparatus onto the work counter.

16. An apparatus according to claim 15, wherein the access opening is provided with switch means at the upper and lower edges thereof for stopping the first drive means when the switch means is contacted by a tray, said switch means comprising a rotatable roller member mounted adjacent and extending partially along the lower edge of said opening with said roller member being positioned above the work surface of said work counter.

17. An apparatus according to claim 16, wherein the work surface of said work counter has an upwardly extending stop flange thereon running substantially parallel to the lower edge of said opening, the distance between said roller member and said stop flange being less than the width of a tray.

18. An apparatus according to claim 16, wherein the front bottom edge of the tray is sloped so as to permit the tray to be cammed upwardly over the roller member when being removed from the horizontal shelf portion.

19. An apparatus according to claim 16, wherein said switch means includes a round bar member extending along the upper edge of said access opening.

20. An apparatus according to claim 16, wherein said switch means includes a second roller member rotatable about its longitudinal axis with said second roller member extending partially along the upper edge of the access opening.

21. An apparatus according to claim 20, wherein both the first-mentioned and second roller members extend substantally across the lower and upper edges of the access opening, and further including vertical strip members interconnecting adjacent ends of said first-mentioned and second roller members with said roller members being mounted in said strip members for rotation about horizontal axes, said strip members being mounted on said cabinet and being longitudinally displaceable relative thereto, and resilient means biasing said strip members into a selected position relative to said cabinet.

22. An apparatus according to claim 21, wherein a switch member is mounted on said cabinet adjacent one of said vertical strip members, said switch member being adapted to de-energize said first drive means, said one vertical strip member having an extension thereon adapted to contact and actuate said switch member when the vertical strip member is displaced from said selected position.

23. An apparatus according to claim 16, wherein a switch member is positioned adjacent said roller member, said switch member having a movable contact adapted to be actuated by said roller member de-energizing said first drive means.

24. An apparatus according to claim 20, including means mounting said first-mentioned roller member on said cabinet for relative movement with respect thereto, means mounting said second roller member on said cabinet for relative movement with respect thereto, resilient means biasing said roller members into selected positions, a first switch member positioned adjacent said first-mentioned roller member and a second switch member positioned adjacent said second roller member, each of said switch members being adapted to be contacted by its associated roller member when said roller member is moved from said selected position whereby the associated switch member causes the first drive means to be de-energized.

References Cited

UNITED STATES PATENTS

| | | | |
|---|---|---|---|
| 2,621,995 | 12/1952 | Zenner et al. | 312—223 |
| 2,825,616 | 3/1958 | Cole | 312—223 |
| 3,105,727 | 10/1963 | Andors | 312—223 |
| 3,166,366 | 1/1965 | Krug et al. | 312—223 |
| 3,236,577 | 2/1966 | Anders et al. | 312—223 |

CASMIR A. NUNBERG, *Primary Examiner.*